US007289467B2

(12) United States Patent
Bourlas et al.

(10) Patent No.: US 7,289,467 B2
(45) Date of Patent: Oct. 30, 2007

(54) ADAPTIVE CALL CONTROL FOR USE IN A WIRELESS COMMUNICATION SYSTEM

(75) Inventors: Yair Bourlas, San Diego, CA (US); Kenneth L. Stanwood, Cardiff by the Sea, CA (US); Brian Spinar, San Diego, CA (US); Sheldon L. Gilbert, San Diego, CA (US)

(73) Assignee: Wi-LAN Inc., Ottawa, Ontario (CA)

( * ) Notice: Subject to any disclaimer, the term of this patent is extended or adjusted under 35 U.S.C. 154(b) by 0 days.

(21) Appl. No.: 11/350,464

(22) Filed: Feb. 8, 2006

(65) Prior Publication Data

US 2006/0126549 A1 Jun. 15, 2006

Related U.S. Application Data

(62) Division of application No. 10/032,044, filed on Dec. 21, 2001, now Pat. No. 7,023,798.

(60) Provisional application No. 60/258,428, filed on Dec. 27, 2000.

(51) Int. Cl.
*H04Q 7/00* (2006.01)
*H04J 3/16* (2006.01)
*H04J 3/22* (2006.01)

(52) U.S. Cl. ...................................... 370/328; 370/465
(58) Field of Classification Search ................. 370/310, 370/328, 465, 468
See application file for complete search history.

(56) References Cited

U.S. PATENT DOCUMENTS 3,949,404 A 4/1976 Fletcher et al.
4,495,619 A 1/1985 Acampora
5,130,983 A 7/1992 Heffner, III
5,297,144 A 3/1994 Gilbert et al.
5,420,851 A 5/1995 Seshadri et al.
5,444,698 A 8/1995 Kito (Continued)

FOREIGN PATENT DOCUMENTS

EP 0507384 A2 3/1992

(Continued)

OTHER PUBLICATIONS

"Asynchronous Transfer Mode (ATM) Technical Overview", 2nd Edition, Prentice Hall, Oct. 1995, Chapter 3, pp. 21-25.

(Continued)

*Primary Examiner*—Kevin C. Harper
(74) *Attorney, Agent, or Firm*—Procopio, Cory, Hargreaves & Savitch LLP

(57) ABSTRACT

The invention relates to communication systems and to systems and methods for implementing adaptive call control in such systems. Adaptive call control can determine what CPE to base station calls (connections) are allowed at any given time. Call control, coupled with precedence, can further determine what connections are suspended if less bandwidth is available than is currently committed. Multiple techniques are disclosed to select connections for suspension. These techniques include suspending enough connections through the affected CPE until there is enough bandwidth to meet the remaining commitment, randomly (or in a round robin fashion) choosing connection to suspend from the entire set of connection, and using precedence priority levels.

79 Claims, 6 Drawing Sheets

U.S. PATENT DOCUMENTS

| | | | |
|---|---|---|---|
| 5,471,645 | A | 11/1995 | Felix |
| 5,511,082 | A | 4/1996 | How et al. |
| 5,615,212 | A | 3/1997 | Ruszczyk et al. |
| 5,638,371 | A | 6/1997 | Raychaudhuri et al. |
| 5,638,374 | A | 6/1997 | Heath |
| 5,675,573 | A | 10/1997 | Karol et al. |
| 5,751,708 | A | 5/1998 | Eng et al. |
| 5,768,254 | A | 6/1998 | Papadopoulos et al. |
| 5,828,695 | A | 10/1998 | Webb |
| 5,857,147 | A | 1/1999 | Gardner et al. |
| 5,859,619 | A | 1/1999 | Wu et al. |
| 5,890,055 | A | 3/1999 | Chu et al. |
| 6,006,069 | A | 12/1999 | Langston |
| 6,016,311 | A | 1/2000 | Gilbert et al. |
| 6,016,313 | A | 1/2000 | Foster, Jr. et al. |
| 6,038,455 | A | 3/2000 | Gardner et al. |
| 6,094,421 | A | 7/2000 | Scott |
| 6,112,080 | A | 8/2000 | Anderson et al. |
| 6,141,317 | A | 10/2000 | Marchok et al. |
| 6,519,462 | B1 | 2/2003 | Lu et al. |
| 6,636,500 | B2 * | 10/2003 | Krishnamoorthy et al. . 370/347 |
| 2002/0061006 | A1 * | 5/2002 | Soliman ..................... 370/342 |

FOREIGN PATENT DOCUMENTS

| | | | |
|---|---|---|---|
| EP | 0845916 | A2 | 12/1997 |
| EP | 0891060 | A2 | 6/1998 |
| WO | WO 9222162 | | 12/1992 |
| WO | WO 9909779 | A | 2/1999 |
| WO | WO 9953700 | A | 10/1999 |
| WO | WO 00/49824 | * | 8/2000 |
| WO | WO 0049824 | A | 8/2000 |

OTHER PUBLICATIONS

C.E. Shannon, "A Mathematical Theory of Communication", Bell System Technical Journal, pp. 379-423 (Part 1), 623-656 (Part II), Jul. 1948.

H.C. Papadopoulos et al., Reduction of Mixed Co-channel Interference in Microcellular STDD Systems, Vehicular Technology Conference, 1995 IEEE 45$^{th}$, vol. 2, pp. 759-763.

L.H. Charles Lee, "Convolutional Coding, Fundamentals and Applications", Artech House, Inc., 1997, pp. 11-51.

Lin et al., "Error Control Coding, fundamentals and Applications", Prentice-Hall Computer Applications in Electrical Engineering Series., 1993, pp. 315-349.

Redi et al., "An Introduction to GSM", Artech House, Inc., 1995; pp. 84, 85 and 95.

Sampei et al., "Adaptive Modulation/TDMA Scheme for Personal Multi-Media Communication Systems", Proceedings of the Global Telecommunications Conference, U.S., New York, IEEE, Nov. 28, 1994, pp. 989-993.

Ue et al., "Symbol Rate and Modulation Level Controlled Adaptive Modulation/TDMA/TDD for Personal Communication Systems", Proceedings of the Vehicular Technology Conference, U.S. New York, IEEE, vol. Conf. 45, Jul. 25, 1995, pp. 306-310.

Ulm et al., "Data-Over-Cable Interface Specifications, Radio Frequency Interface Specification", Hewlett Packard Interim Specification, Doc. Control No.: SP-RFII01-970321, published Mar. 21, 1997 by MCNS Holdings, L.P., Section 6, pp. 43-85.

Wolf et al., "On the Weight Distribution of Linear Block Codes Formed From Convolutional Codes", IEEE, IEEE Transactions on Communications, vol. 44:9, Sep. 1996.

* cited by examiner

ADAPTIVE CALL CONTROL FOR USE IN A WIRELESS COMMUNICATION SYSTEM

RELATED APPLICATIONS

This application is a divisional of application Ser. No. 10/032,044, filed Dec. 21, 2001 now U.S. Pat. No. 7,023,798, entitled ADAPTIVE CALL ADMISSION CONTROL FOR USE IN A WIRELESS COMMUNICATION SYSTEM, which claims priority to U.S. provisional patent application Ser. No. 60/258,428, filed Dec. 27, 2000, entitled ADAPTIVE CALL ADMISSION CONTROL FOR USE IN A COMMUNICATION SYSTEM, all of which are incorporated herewith by reference.

BACKGROUND OF THE INVENTION

1. Field of the Invention

The present invention relates to communication systems and to a system and method for implementing adaptive call admission control in such systems.

2. Description of the Related Art

A wireless communication system facilitates two-way communication between a plurality of subscriber units (fixed and portable) and a fixed network infrastructure. Exemplary communication systems include mobile cellular telephone systems, personal communication systems ("PCS"), and cordless telephones. An objective of these wireless communication systems is to provide communication channels on demand between the subscriber units and their respective base stations in order to connect a subscriber unit end user with the fixed network infrastructure (usually a wire-line system). In the wireless systems having multiple access schemes, a time "frame" is used as the basic information transmission unit. Each frame is sub-divided into a plurality of time slots. Subscriber units typically communicate with their respective base station using a "duplexing" scheme thus allowing for the exchange of information in both directions of the connection.

Transmissions from the base station to the subscriber units are commonly referred to as "downlink" transmissions. Transmissions from the subscriber units to the base station are commonly referred to as "uplink" transmissions. Depending upon the design criteria of a given system, wireless communication systems have typically used either time division duplexing ("TDD") or frequency division duplexing ("FDD") methods to facilitate the exchange of information between the base station and the subscriber units.

SUMMARY OF THE INVENTION

The systems and methods have several features, no single one of which is solely responsible for its desirable attributes. Without limiting the scope as expressed by the claims which follow, its more prominent features will now be discussed briefly. After considering this discussion, and particularly after reading the section entitled "Detailed Description" one will understand how the features of the system and methods provide several advantages over traditional communication systems.

One aspect is a communication system that is configured to adaptively adjust connections and control the suspension of the connections between a base station and customer premise equipments (CPEs), wherein the base station and the CPEs are each configured to increase or decrease the robustness of their transmission modulation technique by adapting their PHY mode. The system comprises a first CPE having a first modem configured to modulate data in a communication link using a first current PHY mode and a first planned PHY mode, a second CPE having a second modem configured to modulate data in a communication link using a second current PHY mode and a second planned PHY mode, and a base station having a third modem configured to transmit and receive data to and from the first and second CPEs. The system further comprises a control module configured connection to adjust a connection between the first CPE and the base station or between the second CPE and the base station, and determining whether to suspend a connection based on a comparison of a total air link line rate between the first and second CPEs and the base station, wherein the total air link line rate is based on a reference PHY mode, with a bandwidth commitment value between the base station and the first and second CPEs, wherein the bandwidth commitment is based on the first and second planned PHY modes.

Another aspect is a method for controlling the admission of connections in a wireless communication system between a base station and associated CPEs, including a requesting CPE. The method comprises receiving a request for a new connection from a requesting CPE, summing the hard bandwidth commitments between a base station and associated CPEs, including the new connection and existing connections, based on a planned PHY mode for each connection, and determining an air link line rate between the base station and the associated CPEs based on a reference PHY mode. The method further includes if the air link line rate exceeds the hard bandwidth commitments, accepting the new connection and determining a second hard bandwidth commitments for the existing connections between the base station and the associated CPEs based on a current PHY mode for each connection, else denying the new connection. The method still further includes if the air link line rate exceeds the second hard bandwidth commitments, allocating air link resources to the new connection, else determining whether additional air link resources are available, and if additional air link resources are available, allocating the air link resources to the new connection, else suspending at least one of the existing connections between the base station and the associated CPEs.

DETAILED DESCRIPTION

The following detailed description is directed to certain specific embodiments of the invention. However, the invention can be embodied in a multitude of different systems and methods. In this description, reference is made to the drawings wherein like parts are designated with like numerals throughout.

In connection with the following description many of the components of the various systems, some of which are referred to as a "module," can be implemented as software, firmware or a hardware component configured to perform one or more functions or processes. Hardware components can include, for example, a Field Programmable Gate Array (FPGA) or Application-Specific Integrated Circuit (ASIC). Such components or modules may reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computers.

Figure 1:
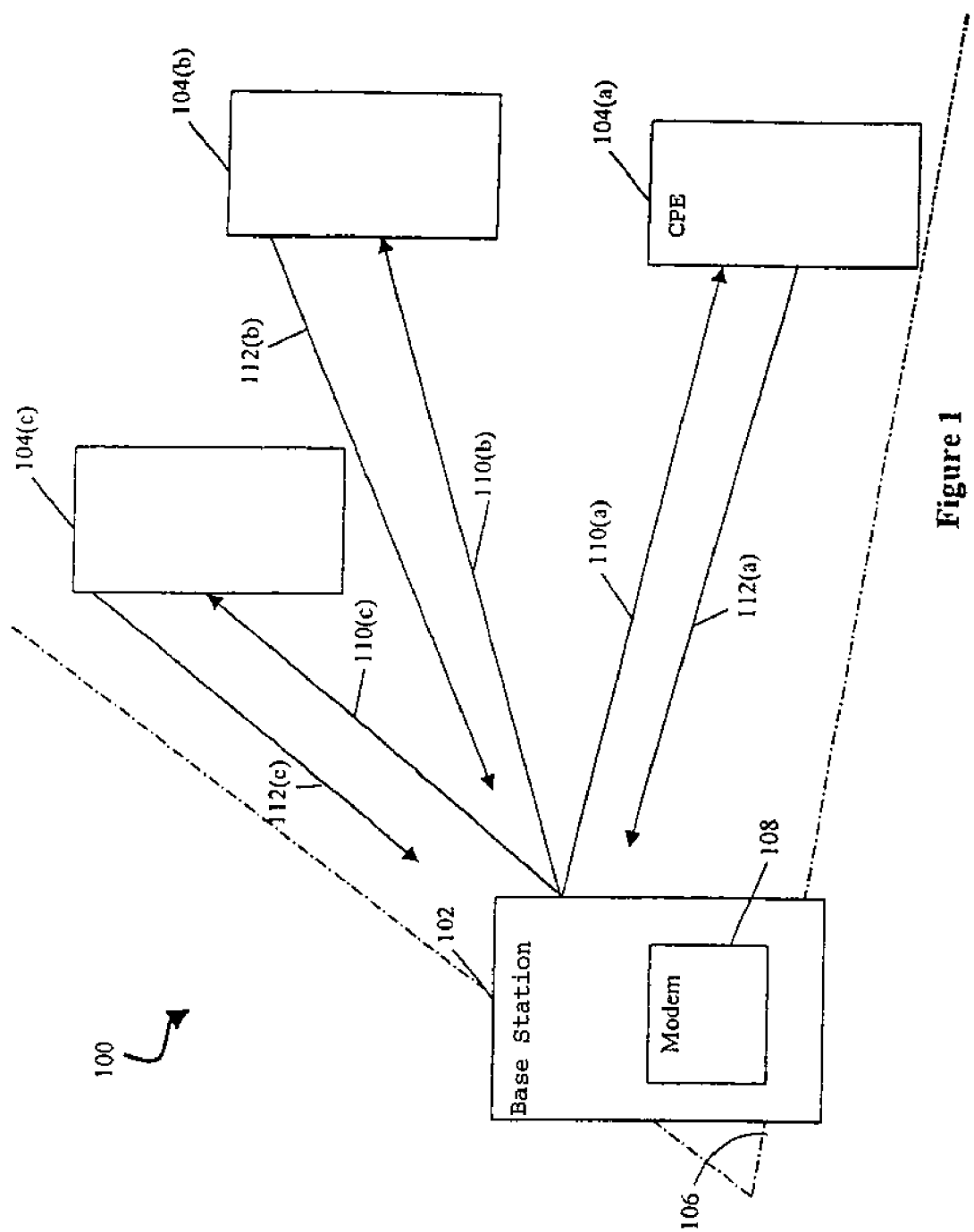
FIG. 1 is a simplified block diagram of a wireless communication system including a base station and one or more CPEs.

FIG. 1 is a block diagram of an exemplary wireless communication system 100. Alternatively, the methods and systems herein disclosed can be implemented in wired communication systems (not shown). One exemplary broadband wireless communication system is described in U.S. Pat. No. 6,016,311, by Gilbert et al., issued Jan. 18, 2000, entitled "Adaptive Time Division Duplexing Method and Apparatus for Dynamic Bandwidth Allocation within a Wireless Communication System," hereby incorporated by reference. The system 100 includes a base station 102 and at least one customer premise equipment. The system depicted in FIG. 1 shows three CPEs 104(a)–(c). More or fewer CPEs can be used. The CPEs and the base station receive and transmit data along wireless communication links 110(a)–(c), 112(a)–(c).

FIG. 1 does not show buildings or other physical obstructions (such as trees or hills, for example), that may cause channel interference between data from communication links 110, 112. The CPEs 104 and the base station 102 communicate by transmitting their data as radio frequency signals. The term channel refers to a band or range of radio frequencies of sufficient width for communication. For example, the range of frequencies from 26.500 GHz to 26.525 GHz would provide a 25 MHz wide channel. Although the following discussion uses the example of a system that transmits information within the Local Multi-Point Distribution Services (LMDS) band at frequencies of approximately 28 GHz, the invention is not so limited. Information can be transmitted at various frequencies and ranges including, for example, 10 GHz to 66 GHz using Quadrature Amplitude Modulation (QAM) symbols. The systems and methods described herein can also be used in a Multichannel Multi-point Distribution Service (MMDS) which operates below 10 GHz. In the MMDS, Orthogonal Frequency Division Multiplexing (OFDM) symbols may be transmitted between the base station and CPEs as an alternative to single carrier QAM modulation. In such a system, the methods and systems are applied to one or more of the OFDM subchannels.

Referring again to FIG. 1, the communication links 110(a), 110(b), 110(c) are referred to as downlinks (i.e., from the base station 102 to the CPE's 104) and can operate on a point (base station)-to-multi-point (CPE's) basis. Transmissions to and from the base station 102 can be directional in nature, and thus limited to a particular transmission sector 106 of the base station 102. Within a given sector 106, CPEs 104(a), 104(b), 104(c) receive the same transmission along their respective downlinks 110(a), 110(b), 110(c). To distinguish between data intended for a specific CPE, the CPEs can monitor control information in their respective downlink 110(a), 110(b), 110(c) and typically retain only the data intended for them. In communication systems that have multiple sectors, the base station 102 can include a sectored active antenna array (not shown) which is capable of simultaneously transmitting to multiple sectors. In one embodiment of the system 100, the active antenna array transmits to four independent sectors.

The communication links 112(a), 112(b), 112(c) are referred to as an uplink (i.e., from the CPEs 104 to the base station 102) and can operate on a point-to-point basis. Thus, in FIG. 1, each CPE 104(a), 104(b), 104(c) originates its own uplink 112(a), 112(b), 112(c). Communication with the base station 102 is bi-directional and can be multiplexed on the basis of Time Division Duplexing (TDD). For a TDD transmission from, for example, CPE 104(a), CPE 104(a) would send its data along communication link 112(a) to the base station 102 during a preassigned time slot in a transmission frame. The specific frame structures of the uplink and downlink will be discussed further below.

Alternatively, the system can employ Frequency Division Duplexing (FDD). In such an FDD system, duplexing of transmissions between the base station and the CPEs is performed in the frequency domain. Different sets of frequencies are allocated for uplink and downlink transmissions. The systems and methods described herein can be used in such an FDD system.

Each CPE 104 is further coupled to a plurality of end users that may include both residential and business customers. Each customer can have one or more connections between the CPE and the base station. Consequently, each end user connection can have different and varying usage and bandwidth requirements. Each CPE 104(a)–(c) may service several hundred or more end users, but at least one end user will be assigned to transmit and receive data via at least one connection through each CPE 104.

The data transmitted along the communication links 110, 112 is in analog form, and thus a modem 108 is used to modulate the digital data prior to transmission. FIG. 1 illustrates the modem 108 being located at the base station 102, however, a similar or identical modem 108 may be used at the other end of the downlinks 110(a), 110(b), 110(c) to demodulate the received analog data. Thus, the modems 108 in the base station and each CPE are used for uplinking data from the CPEs to the base station and for downlinking data from the base station to the CPEs.

The base station and CPEs can use adaptive modulation and forward error correction (FEC) schemes to communicate. Adaptive modulation, or adaptable modulation density, includes varying the bit per symbol rate modulation scheme, or modulation robustness, of downlinks and uplinks transmitted between CPEs and the base station. Examples of such modulation schemes include quadrature amplitude modulation-4 (QAM-4), QAM-16, QAM-64, and QAM-256. If QAM-4 is used, each resulting symbol represents two bits. If QAM-64 is used, each resulting symbol represents six bits. Adaptive FEC includes varying the amount of error correction data that is transmitted in the downlink and/or uplink. Channel characteristics, for example the modulation and FEC, for the downlink and/or uplink can be varied independently. For ease of explanation, the phrase "PHY mode" is used to indicate characteristics of a communication channel or link, including for example, modulation scheme and/or an FEC.

The PHY mode(s) planned for use in the sector 106 is normally determined as a function of the geographical relationship between the base station 102 and the CPEs, the rain region, and the implementation or modem complexity of the CPEs. Examples of rain regions include rain regions A-Q. Recommendations for modeling the rain region's effect on signal propagation can be found in Rec. ITU-R PN.837.1. Thus, a planned PHY mode may be different for the CPEs depending on the capabilities and transmission quality of each CPE 104 and base station 102 pair. For ease of explanation, the phrase "planned PHY mode" is used to indicate the planned PHY mode for a CPE 104 and base station 102 pair as described above.

Better environmental conditions, e.g., less distance, between some CPEs (such as CPE 104(*c*) for example) and the base station 102 may permit the use of a less robust PHY mode by such CPEs as compared to a PHY mode used by CPEs located farther from the base station. For example, if CPE 104(*c*) is capable of receiving QAM-64 data coupled with achieving adequate transmission quality between CPE 104(*c*) and the base station 102, all data transmitted between the CPE and the base station can be modulated using QAM-64. In the same system CPEs 104(*a*), 104(*b*), which, for example, are only capable of receiving QAM-4 data, will only transmit and receive QAM-4 data. By using different or variable PHY modes for different CPEs associated with a single base station, the communication system 100 as a whole increases its bandwidth utilization.

The transmission quality between the base station 102 and a CPE 104 may not only vary between each CPE and base station pair as described above, but may also vary over time, or between the uplink and downlink transmissions of a single pair (i.e. asymmetrical transmissions). For example, in FIG. 1, the transmission quality may significantly decrease during a rain or snow storm. When the link quality is decreased, there is an increased chance that transmitted data along communication links 110(*a*), 110(*b*), 110(*c*), 112(*a*), 112(*b*), 112(*c*) may be unrecognizable or lost to the receiving base station or CPE. To accommodate these time variations in link quality, the communication system 100 can dynamically adjust or "adapt" the PHY mode for each base station 102 and CPE 104. In such an adaptive system, the bandwidth utilization of the communication system 100 further increases.

Figure 2:
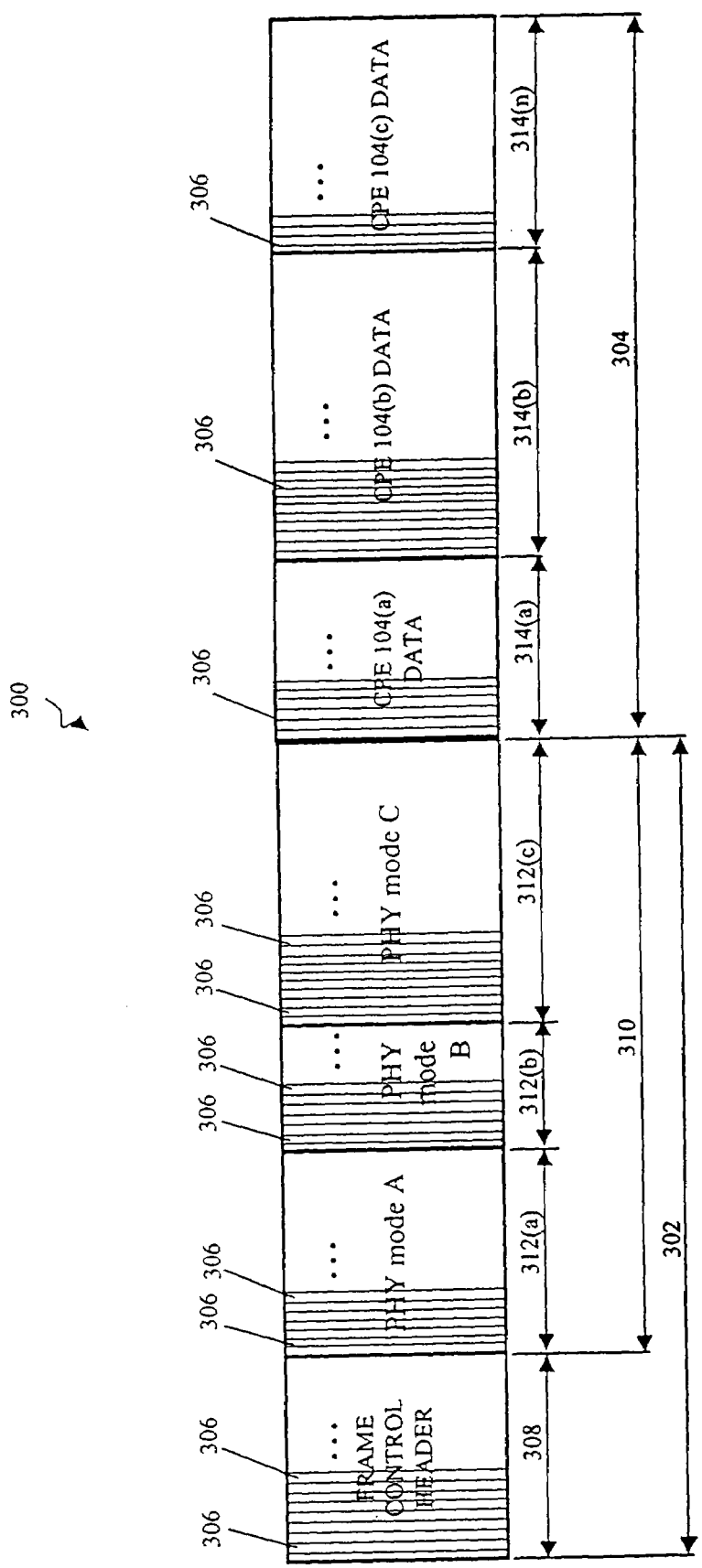
FIG. 2 is an illustration of the structure of a Time Division Duplex ("TDD") frame.

FIG. 2 represents a time division duplexing ("TDD") frame and multi-frame structure for use in communication system 100. Frame 300 includes a downlink subframe 302 and an uplink subframe 304. The downlink subframe 302 is used by the base station 102 to transmit information to the CPEs 104(*a*)–(*c*). In any given downlink subframe 302, all, some, or none of the transmitted information is intended for a specific CPE 104. The base station 102 may transmit the downlink subframe 302 prior to receiving the uplink subframe 304. The uplink subframe 304 is used by the CPEs 104(*a*)–(*c*) to transmit information to the base station 102.

Subframes 302, 304 are subdivided into a plurality of physical layer slots (PS) 306. Each PS 306 correlates with a duration of time. In FIG. 2, each subframe 302, 304 can be one-half millisecond in duration and include 400 PS for a total of 800 PS per frame 300. Alternatively, subframes having longer or shorter durations and with more or fewer PSs can be used. Additionally, the size of the subframes can be asymmetrical and can be varied over time.

Each downlink subframe 302 can include a frame control header 308 and downlink data 310. The frame control header 308 includes information for the CPEs to synchronize with the base station 102. The frame control header 308 can include control information indicating where a PHY mode change occurs in the downlink. The frame control header 308 can also include a map of a subsequent uplink subframe 304. This map allocates the PSs 306 in the uplink subframe 304 between the different CPEs. The frame control header 308 can further include a map of attributes of the downlink data 310. For example, attributes may include, but are not limited to, the locations of the PSs 306 in the subframe 302 that are intended for each individual CPE.

The downlink data 310 is transmitted using a pre-defined PHY mode or a sequence of PHY modes with three PHY modes A, B, and C depicted in FIG. 2 as an example. Individual or groups of PSs 306 in the downlink subframe 302 are assigned to data intended for specific CPEs 104. For example, the base station 102 could assign PSs in one, some, or all of the PHY modes A, B, and C for transmitting data to CPE 104(*a*). In FIG. 2, the data is divided into three PHY modes, where PHY mode A (312(*a*)) is the most robust modulation (i.e. least prone to transmission errors caused by signal interference) and while PHY mode C (312(*c*)) is the least robust (i.e. most prone to transmission errors caused by signal interference). In between these PHY modes is PHY mode B (312(*b*)). Additional PHY modes can also be used.

Still referring to FIG. 2, the uplink subframe 304 comprises uplink data 314(*a*)–(*n*). The uplink subframe 304 is used by the CPEs 104(*a*)–(*c*) to transmit information to the base station 102. The subframe 304 is subdivided into a plurality of PSs 306. Each CPE 104(*a*)–(*c*) transmits its information during its allocated PS 306 or range of PSs 306. The PSs 306 allocated for each CPE can be grouped into a contiguous block of a plurality of data blocks 314(*a*)–(*n*). The CPEs use data blocks 314(*a*)–(*n*) to transmit the uplink subframe 304. The range of PSs 306 allocated to each block in the plurality of data blocks 314(*a*)–(*n*) can be selected by the base station 102. The data transmitted in each data block 314(*a*)–(*n*) is modulated by the transmitting CPE. For example, CPE 104(*a*) modulates and transmits uplink data block 314(*a*). The same or different PHY modes can be used for each data block 314(*a*)–(*n*). The data blocks 314(*a*)–(*n*) can also be grouped by PHY mode.

During its data block, the CPE transmits with a PHY mode that is selected based on measured channel parameters from its prior transmission(s). Similarly, the base station can select a downlink PHY mode for a communication link based on measured channel parameters from its prior transmission(s). The process for selecting a PHY mode will be explained in more detail below. The measured channel parameters can be included in the uplink subframe 304 for transmission by the CPEs to the base station or can be included in the downlink subframe 302 for transmission by the base station to the CPE. Once received, the base station or CPE can utilize the channel parameters to determine if the PHY mode of the downlink subframe 302 or the uplink subframe 304 should be changed.

Each CPE 104 can receive all downlink transmissions that are modulated using its current PHY mode or are modulated using a more robust PHY mode than its current PHY mode. The frame control header 308 is typically modulated using the most robust PHY mode to ensure that all CPEs 104(*a*)–(*c*) may receive it. Because each CPE receives the frame control header, each CPE 104 is initially synchronized with the downlink subframe 302 at the beginning of the frame 300. The downlink subframe can be sorted by robustness, which allows each CPE to maintain synchronization during the subsequent portion of the downlink that could include data for that CPE.

Figure 3:
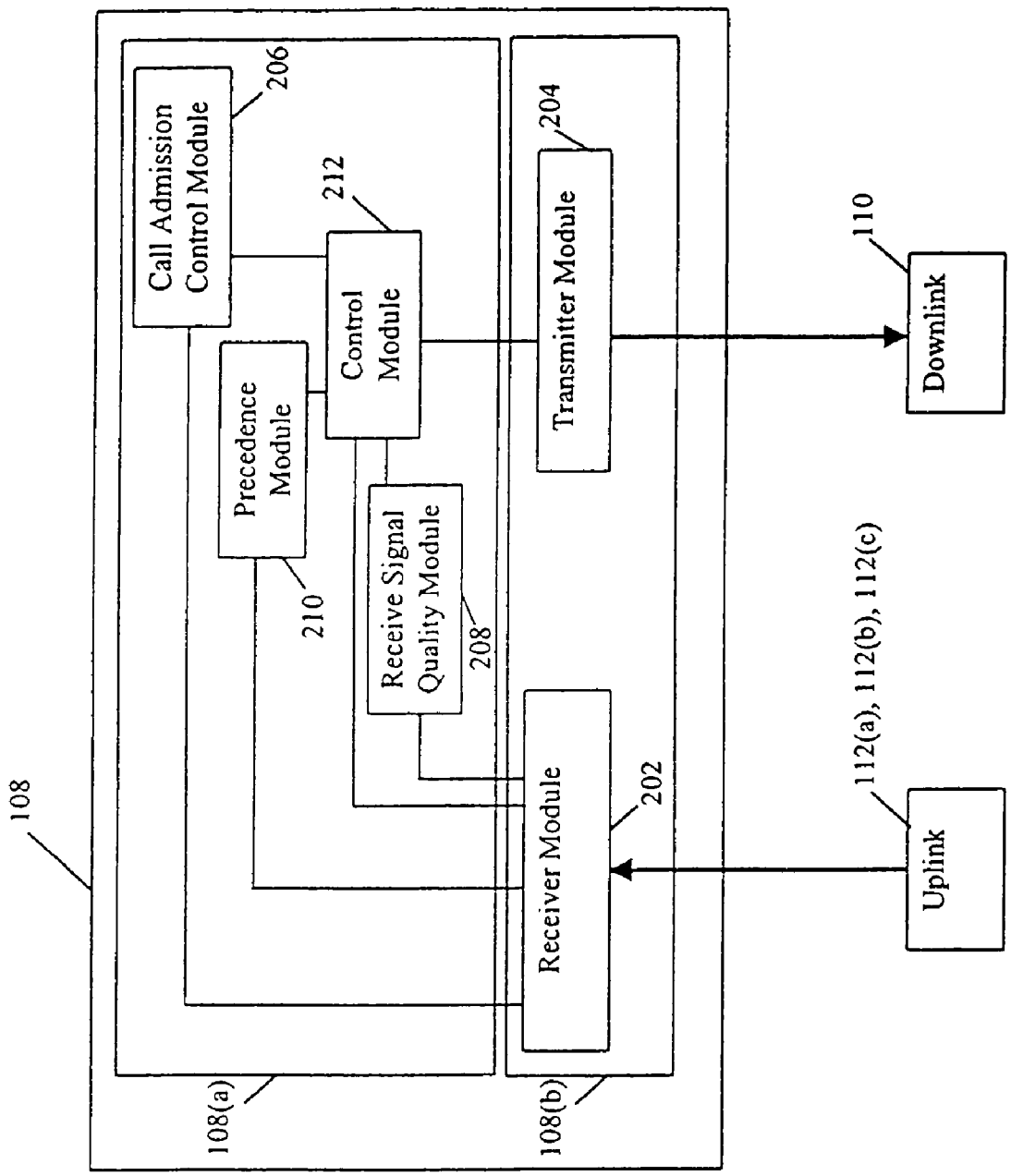
FIG. 3 is a block diagram of a modem.

FIG. 3 is a block diagram of a modem 108 which can be used to modulate/demodulate data in the wireless communication system 100 described above. The modem 108 is used to control the number and quality of existing and new connections between the CPEs and base station. Modems 108 are used by the base station 102 and CPEs 104 to modulate and demodulate data. For ease of description, the modem 108 will now be described with reference to the base station 102.

The modem 108 can include a control section 108(a) and a modem section 108(b). The modem section 108(b) includes a receiver module 202 and a transmitter module 204. The control section 108(a) includes a call admission control (CAC) module 206, a Receive Signal Quality (RSQ) module 208, a precedence module 210, and a control module 212. Alternatively, the functionality provided for by the control section 108(a) can be separate from the modem 108. Further, the control section 108(a) components and modules may be combined into fewer components and modules or further separated into additional components and modules within the base station 102 and/or CPE 104.

At a base station 102, the transmitter module 204 converts digital data to an appropriately modulated analog signal communicated as a downlink 110, using for example, QAM modulation and FEC. The analog signal may also be up converted to a carrier frequency prior to transmission. The receiver module 202 at the base station 102 demodulates an uplink 112(a), 112(b), 112(c) and converts it back to digital form. When configured as a CPE 104(a), the transmitter module 204 converts digital data to an appropriately modulated analog signal communicated as an uplink 112, using for example, QAM modulation and FEC. The analog signal may also be up converted to a carrier frequency prior to transmission. The receiver module 202 at the CPE 104 demodulates a downlink 110 and converts it back to digital form.

The wireless communication system 100 can provide "bandwidth-on-demand" to the CPEs. Thus, the uplink can include bandwidth requests for new and existing connections from end users. The CPEs request bandwidth allocations from their respective base station 102 based upon the type and quality of service requested by the end users served by the CPE. A CPE or base station can continue an existing connection or allow a new connection depending on, for example, a user's defined quality of service, bandwidth needs, and transmission quality. Thus, each end user potentially uses a different broadband service having different bandwidth and latency requirements. Moreover, each user can select a portion(s) of their bandwidth to have variable priority levels, or precedence.

To this end, the type and quality of service available to the end users are variable and selectable. The amount of bandwidth dedicated to a given service can be determined by the information rate and the quality of service required by that service (and also taking into account bandwidth availability and other system parameters as will be described below). For example, T1-type continuous data services typically require a great deal of bandwidth having well controlled delivery latency. Until terminated, these services require constant bandwidth allocation for each downlink subframe 302 and uplink subframe 304 in a frame 300 (see FIG. 2). In contrast, certain types of data services such as Internet Protocol data services ("TCP/IP") are bursty, often idle (which at any one instant may require zero bandwidth), and are relatively insensitive to delay variations when active.

Referring again to FIG. 3, the Receive Signal Quality (RSQ) module 208 interfaces with the receiver module 202 and the control module 212. The RSQ module 208 is configured to monitor signal quality of the received uplink signal. In a communication system that adapts PHY modes, the selection of a PHY mode can be based on channel parameters monitored/measured by the RSQ module 208. These channel parameters can include the signal to noise ratio (SNR) of the modulated data at the receiver module 202 at the base station 102. A bit error rate (BER), at the base station 102 or CPE 104, can also be used in selecting the PHY mode. For example, when the received signal drops below a threshold value for a SNR, a more robust PHY mode can be selected by the modem 108 for the connection. Signal quality can be measured over a period of time by the RSQ module 208, and, in response to changes in the signal quality, the control module 212 determines if the PHY mode for the transmitting CPE should be changed. The control module 212 at the base station 102 interfaces with the transmitter module 204 to control the PHY mode for the modem 108. Further, the control module 212, via the transmitter module 204, can alert the transmitting CPE to change its PHY mode. Measuring signal quality over time helps avoid cyclic changes in the PHY mode due to transient changes in the communication link's quality.

The RSQ module at the CPE can measure signal quality for a signal that is transmitted by the base station 102 and received by the CPE. The CPE can alert the base station to change the base station's transmitting PHY mode. In one embodiment, only the modem 108 at the base station 102 includes the control module 212. In this embodiment, each CPE measures its own signal quality and transmits its value within its uplink 112 to the base station 102. The control module 212 is then able to monitor the signal quality of the signal received by the CPEs to determine if the downlink 110 PHY modes should be changed.

The call admission control (CAC) module 206 determines what CPE to base station connections are allowed at any given time. For example, the receiver module 202 can receive a request for a new connection between the CPE and base station in the uplink 112. The CAC module determines whether to grant that request. This determination can be based on intrinsic factors relating to the new connection as well as communication system level factors. Examples of intrinsic factors are a quality of service and a type of service requested by the end user for the new connection. The extrinsic factors are external to the new connection. The extrinsic factors can include the type and quality of service for the existing connections, whether available bandwidth is allocated to the requesting CPE, the available bandwidth in the communication link, and the portion of the frame that is allocated for the uplink and downlink. An example of a type and quality of service that can be evaluated by the CAC module 206 are hard bandwidth commitments.

The CAC module 206 can be configured to determine whether there will be enough bandwidth to support all of the connections between the CPEs 104 and the base station 102. For example, the CAC module 206 can determine whether there will be enough bandwidth for hard bandwidth commitments between the base station and CPEs. These hard bandwidth commitments can include, for example, constant bit rate (CBR) connections, the minimum cell rate (MCR) portion of a guaranteed frame rate (GFR) connections, and some function of sustainable cell rate (SCR) for variable bit rate (VBR) and variable bit rate real-time (VBR-rt) connections. Alternatively, hard bandwidth commitments could be the bandwidth measured, rather than calculated, that is necessary to provide the quality of service (QoS) desired for the connection. For ease of explanation, the following description uses hard bandwidth commitments as an exemplary type of connection. However, the systems and methods disclosed herein are not so limited and can be applied to any type of connection. Further, the systems and methods can be applied to one or more types of connections.

The CAC module 206 determines whether there is enough bandwidth to allow the new connection. This can be determined by summing the hard bandwidth commitments for each connection on each CPE 104(a), 104(b), 104(c) (see FIG. 1). Thus, each CPE will have a hard bandwidth commitment for its existing connections. All of the hard bandwidth commitments from the CPEs can then be summed to get the total hard bandwidth commitments for all of the existing connections through base station 102. The control module 212 can perform these calculations. The CAC module 206 compares the total hard bandwidth commitments to an air link line rate. The air link line rate is the amount of bandwidth available between the CPEs and base station. If the air link line rate exceeds the total hard bandwidth commitments, the new connection is allowed. If the total hard bandwidth commitments meet or exceed the air link line rate, the CAC module 206 denies the new connection.

In the communication system described above, each connection between the CPE 104 and base station 102 will have a planned PHY mode. The planned PHY mode is used by the CAC module 206 in determining whether to allow the new connection. As will be explained below, the calculation of the total hard bandwidth commitments for any given sector 106 (see FIG. 1) presents additional difficulties for communication systems 100 which adapt PHY modes.

In communication systems 100 that adapt, or vary, their PHY modes, the available bandwidth necessary for existing connections can vary. Since each PHY mode used by the base station 102 and/or CPE 104 for its communication link 110(a)–(c), 112(a)–(c) is adaptive, the robustness of each communication link can vary (see FIG. 1). As the robustness varies, the bandwidth allocated for an existing connection or new connection will also vary.

In such communication systems, connections are allowed to be modulated with PHY modes that are more or less robust than the planned PHY mode. Each end user connection can dynamically select its current PHY mode. This current PHY mode can be different than the planned PHY mode that was planned for the connection. If a connection is modulated using a more robust PHY mode than the planned PHY mode, the connection will exceed its allocated bandwidth.

In an embodiment of a communication system 100 that adapts PHY modes, the CAC module 206 allows new connections with reference to a minimum air link line rate. The minimum air link line rate is a measure of bandwidth that would be required if all of the existing connections between the CPEs and base station were modulated using a least efficient PHY mode regardless of whether the least efficient PHY mode is actually used. The least efficient PHY mode can include, for example, QAM-4 modulation with a maximum amount of FEC overhead bits. This method ensures that during adverse weather conditions each CPE will be able to select its least efficient PHY mode and transmit its data within its assigned bandwidth without losing its connection with the base station. In this embodiment, the CAC module 206 will deny a new connection if the new connection will cause the CPE to exceed its minimum air link line rate. The CAC module 206 can determine whether to allow or deny a new connection in conjunction with the control module 212. During spells of good weather, the CPE can select a less robust PHY mode for its current PHY mode. By selecting a less robust PHY mode, additional bandwidth between the CPE and base station would be freed up. However, the communication system 100 is constrained from taking advantage of the freed up bandwidth when the decision to allow new connections is based upon the minimum air link line rate.

In another embodiment of the communication system 100 that adapts PHY modes, the CAC module 206 allows the CPE to take advantage of the freed up bandwidth. The CAC module 206 limits new connections based on a comparison of the bandwidth required for the connection if it is modulated using the CPE's planned PHY mode with the available bandwidth. The available bandwidth is determined by summing the CPE's hard bandwidth commitments that would be used by the existing connections if those connections were modulated using the planned PHY mode of the CPE. If the available bandwidth is equal to or exceeds the bandwidth required for the new connection, the CAC module 206 will allow the connection. However, if the CPE operates using a less robust PHY mode than its preferred PHY mode, there is the potential that data through the CPE will be lost.

In the presence of adaptive PHY modes and to take advantage of the CPE's planned PHY mode, the bit rate associated with each connection's PHY mode is compared. Connections at different PHY modes (modulation and FEC) effectively have different bit rates, or air link line rates, and thus are not directly compared. One method for comparing these bit rates is to normalize the PHY modes associated with each connection.

Equation 1, below, can be used to normalize the bandwidth used for connections through an individual CPE.

$$W_{CPEi} = \sum_{i=1}^{n} ER * \text{mod} \qquad \text{Equation 1}$$

Where $W_{CPEi}$ is a normalized value or weight for the entire bandwidth used by an individual CPE. $W_{CPEi}$ is proportional to the equivalent bandwidth of its connections and the current modulation associated with each connection. Er is the number of bits per unit time that are transmitted by the CPE for a connection. Each connection is modulated using an associated PHY mode. The term mod is the inverse of the associated PHY mode efficiency that is used to modulate the connection. The bit/symbol rate for QAM-64 is 6, for QAM-16 is 4, and for QAM-4 is 2. For example, if during a first connection between CPE 104(a) and the base station 102, 10,000 bits/s were transmitted using QAM-4, and during a second connection between CPE 104(a) and the base station, 18,000 bits/s were transmitted using QAM-64, Equation 1 would be:

$W_{CPE104(a)}$=(10,000 bits/s*½ symbol/bit)+(18,000 bits/s*⅙ symbol/bit)=8,000 bits/s.

The 8,000 bits/s for CPE 104(a) is then added to $W_{CPE104(b)}$ and $W_{CPE104(c)}$ to determine a total normalized bandwidth for the CPEs in sector 106.

Normalization is used to determine the effective hard bandwidth commitment usage through the modem 108. The CAC module 206 interfaces with the control module 212 to compare the different PHY modes for the existing connections and the new connection with the available bandwidth between the base station 102 and CPEs 104. In this embodiment, the control module 212 is configured to normalize each CPE's air link line rate. Once the control module 212 has determined the normalized value for each CPE's committed bandwidth requirements, the CAC module 206 can sum and compare them against a common air link line rate.

Equation 2, below, can be used by the CAC module 206 to determine the total bandwidth used, i.e. $W_{Link}$-W, by all of the CPEs in the sector.

$$W_{Link} = \sum_{i=1}^{n} W_{CPEi} \quad \text{Equation 2}$$

Where $W_{CPEi}$ is a normalized value or weight for the entire bandwidth used by an individual CPE in the sector.

For example, with PHY modes of QAM-4, QAM-16, and QAM-64, each using the same FEC, QAM-4 requires 3 times the air link resources, or bandwidth, of QAM-64 and QAM-16 requires 1.5 times the air link resources of QAM-64. In this example, the control module 212 can normalize to QAM-64. Thus, CPEs operating at QAM-64 would have their hard bandwidth commitments multiplied by a weight of 1, CPE's operating at QAM-16 would have their hard bandwidth commitments multiplied by a weight of 1.5, and CPE's operating at QAM-4 would have their hard bandwidth commitments multiplied by a weight of 3. The CAC module 206 then sums these hard bandwidth commitments and compares the total against a line rate of a communication link operating entirely at the selected normalized PHY mode, QAM-64 with the single FEC. Alternatively, the control module 212 normalizes to QAM-4 by applying weights of ⅓ to QAM-64, ½ to QAM-16, and 1 to QAM-4. The selection of QAM-64 and QAM-4, each with a single FEC, for use as a normalization PHY mode are only examples. Any PHY mode could be used to define the air link line rate for normalizing the connections between the CPEs and base station.

Still referring to FIG. 3, the precedence module 210 will now be described. The precedence module 210 interfaces with the receiver module 202 and the control module 212 to apply a priority, or precedence, to one or more connections when less bandwidth is available than required to meet the hard bandwidth commitments. This can occur when the CAC module 206 is configured as described above to limit new connections based on planned PHY modes of the CPEs but some or all of the CPEs are operating at a more robust (less efficient) current PHY mode. The precedence module 210 determines which connection(s) are to be suspended. However, before connections are suspended, the base station 102 can re-allocate bandwidth, that is not intended for hard bandwidth commitments, among the CPEs to increase the available bandwidth for hard bandwidth commitments. Alternatively or in addition to, in TDD systems, the base station 102 can adjust the portion of a downlink subframe 302 and of an uplink subframe 304 in the frame 300 (see FIG. 2) to increase the available bandwidth for a CPE that requires additional bandwidth due to a change in the current PHY mode or the addition of a connection. However, if additional bandwidth is not available, the precedence module 210 selects which connections from among the CPEs are suspended.

Bandwidth problems can arise when one or more CPEs are using more robust PHY modes than their planned PHY modes for their connections. For example, if communication system 100 was designed for 99.99% availability, a comparison would be made between a CPE's geographical proximity to the base station and the communication system's rain region. Based on this comparison, a planned PHY mode is selected for that CPE that allows it to operate at that planned PHY mode or a less robust PHY mode the entire year except for approximately 53 minutes. If a CPE exceeds a SNR or BER threshold and transmits its uplink using a more robust PHY mode than its planned PHY mode, it will require additional bandwidth for these 53 minutes. At least two things can occur during this 53 minutes depending on whether additional air link resources in the communication system 100 are available. Should additional bandwidth be needed when only a few existing connections, between the base station 102 and CPEs 104 in sector 106, select a more robust PHY mode, the base station 102 may be able to reallocate the available bandwidth. Thus, if the communication system is sufficiently under subscribed, the CPE 104 can use the additional air link resources it requires when using a more robust PHY mode than its planned PHY mode during the 53 minutes. If many existing connections between the base station and CPEs are subject to similar adverse environmental conditions, the base station 102 may be unable to accommodate the CPEs' bandwidth requests. When the air link resources aren't available, the precedence module 210 selects which of the existing connections from the CPEs 104(*a*)–(*c*) to suspend.

The precedence module 210 interfaces with the control module 212 to compare the bit rates for the existing connections through each CPE based on each CPE's current PHY mode. While the CAC module 206 compares the planned PHY modes of the CPEs to determine whether a new connection is allowed, the precedence module 210 compares the current PHY modes to the selected reference air link line rate to determine if a suspension should occur. The control module 212 is configured to compare the current PHY modes of the CPEs. As explained above, one method for comparing the PHY modes is normalization. Once normalized, the precedence module 210 determines if additional bandwidth between the CPEs and base station is available. If additional bandwidth is available, the precedence module 210 can determine a margin value. If additional bandwidth is not available, the precedence module 210 selects which connections are going to be suspended.

The precedence module 210 can be configured to suspend enough connections through the CPE that is requesting additional bandwidth until there is enough bandwidth to meet the remaining demand. The amount of outage during the year for the connections through the affected CPE 104 is planned based on the availability and rain region as discussed above. CPEs 104 located at greater distances from the base station 102 or having limited visibility of the base station would more likely be subject to the application of precedence. In this embodiment, CPE's are penalized by their geographic proximity to the base station 102. For example, the same CPEs, those that are barely able to meet their availability numbers at their planned PHY modes, would be the first to have their hard bandwidth connections with the base station 102 suspended. These CPEs may receive the full brunt of the planned 53 minutes per year outage. In contrast, other CPEs (in particular, those barely unable to meet the availability number at the next less robust PHY mode) would have plenty of bandwidth because connections through the geographically challenged CPE's would be suspended before they need to drop to a more robust PHY mode and request additional bandwidth.

Alternatively, the precedence module 210 can also randomly select connections for suspension or select them in a round robin fashion. The precedence module 210 chooses connection to suspend from the entire set of connections that have hard bandwidth commitments through the CPEs in the sector 106. The CPEs subject to potential suspension include CPEs that may still be operating at their planned PHY mode. In this embodiment, the communication system 100 as a whole, and each individual connection still meets its availability numbers since the planned outage is evenly shared. For example, if a rain fade caused the base station 102 and CPEs to lose half of their bandwidth, each connection from among all of the CPEs would, on average, see only 26 minutes outage per year rather than 53 minutes. Thus, the precedence aspect of adaptive CAC can allow you to increase system availability (26 minutes outage vs 53 minutes outage) or capacity. For example, operating a CPE 104 at a less robust PHY mode than would typically be planned for the CPE increases the system's capacity. The communication system can rely on adaptive CAC coupled with precedence to distribute the outage among all of the CPEs. This achieves the planned 53 minutes outage, but with increased modulation efficiency for the CPE operating at the less robust PHY mode.

Further, the precedence module 210 can use levels in conjunction with the random selection method discussed above when selecting which connections to suspend. In this embodiment, each connection between the CPEs 104(a)–(c) and base station 102 is assigned a precedence level. Alternatively, each CPE is assigned a precedence level for its connections. For example, there are five levels, one through five, with precedence level one being assigned to the most important connections and precedence level five being assigned to the least important connections. The random selection of connections for suspension is applied as discussed above with reference to the second embodiment. However, instead of applying the method of the second embodiment to all connections simultaneously, the precedence module 210 applies it based on each connection's assigned precedence level. Continuing with the example above, the random selection would be initially applied to connections assigned to precedence level five. If and when the precedence level five connections are exhausted, the precedence module 210 applies the random selection process to connections assigned to precedence level four and so on until there is adequate bandwidth available for the remaining connections that have hard bandwidth commitments. Thus, individual connections can be selected to have their uplink or downlink transmissions suspended in favor of other connections.

Further, the precedence module 210 can allow connections to continue to operate with their current PHY mode even when a first SNR or BER threshold is exceeded. Instead, a second threshold is implemented to maintain the connection at the same PHY mode. However, the error rate associated with the connection may increase.

Figure 4:
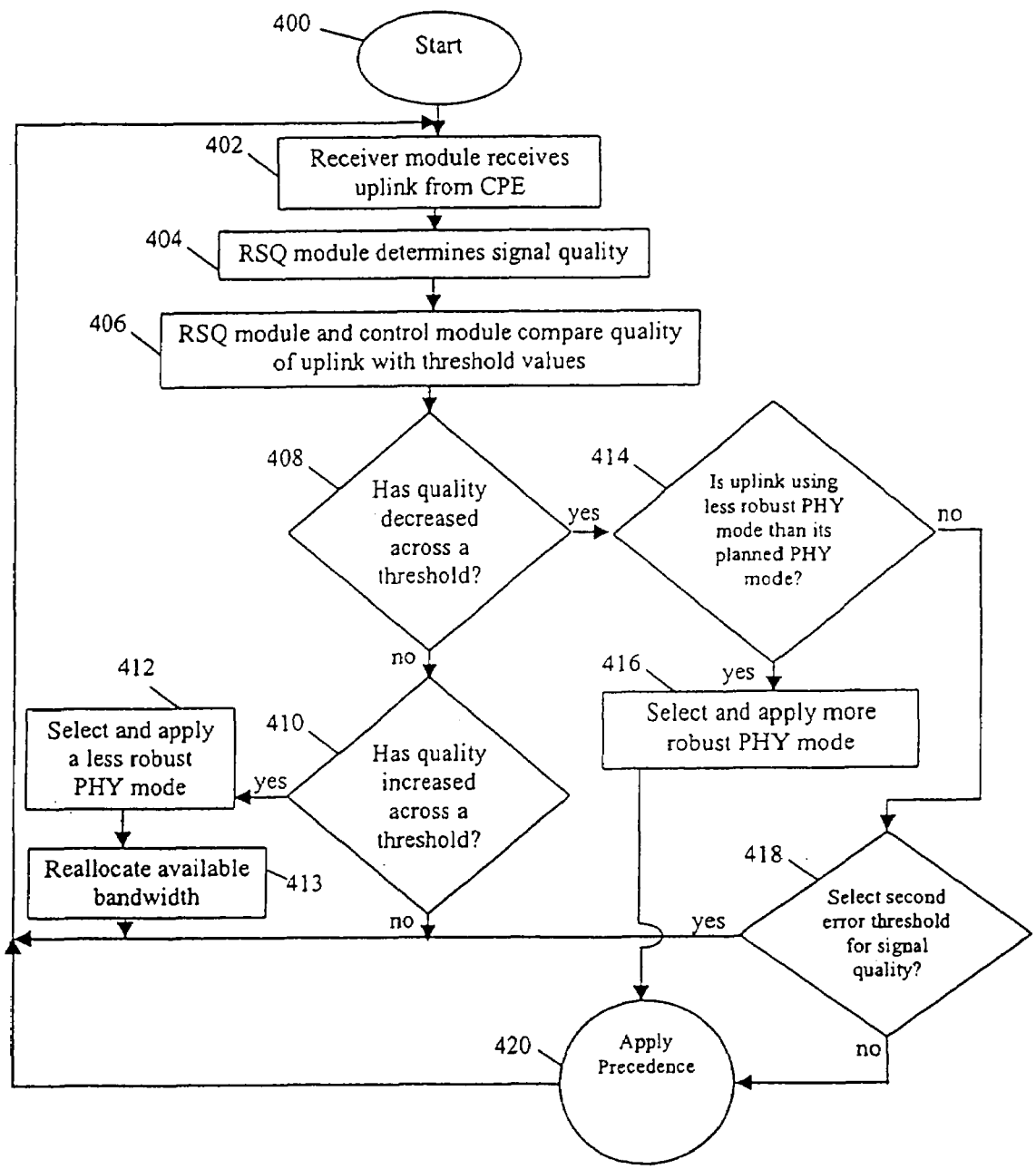
FIG. 4 is a flowchart illustrating the process of adaptively adjusting a PHY mode for an uplink connection between the base station and a CPE.

FIG. 4 is a flowchart illustrating the process of adaptively adjusting a PHY mode for a connection between the base station 102 and a CPE. This process can be implemented by a modem 108 at a base station. Alternatively, this process is performed by a modem 108 at the CPE. A specific CPE 104 can change its uplink PHY mode independent of that CPE's downlink PHY mode. The specific CPE's PHY mode can also be independent of the uplink PHY modes used by other CPEs 104 within the same sector 106. Because the base station 102 must synchronize with each individual CPE 104 that uplinks data, the uplink quality may be different than the downlink quality with a specific CPE 104. The base station 102 can perform the process of adaptively adjusting the uplink PHY mode used by a specific CPE 104. As such, a similar process may be completed for each CPE 104 within the sector 106 in order to adaptively adjust each CPEs 104 uplink modulation.

The following description describes a process for adaptively adjusting a PHY mode for an uplink from a CPE to a base station. The same process is used for adaptively adjusting a PHY mode for a downlink from the base station to the CPE.

In particular, flow begins in start block 400. Flow moves to a block 402 where a receiver module 202 at a base station 102 receives an uplink from a CPE 104. Flow proceeds to block 404, where the quality of the channel parameters for the uplink 112 is determined by a receive signal quality (RSQ) module 208. The quality may be a function of the state of the transmission medium (e.g. air, foggy air, wet air, smoky air, etc.) and the ability of both the transmitting and receiving components (e.g. CPE 104 and base station 102) to respectively transmit and receive data. The base station 102 can determine the quality of each uplink 112(a)–(c). Alternatively, the base station 102 periodically transmits channel parameter measurements, which are indicative of the quality of a CPE's uplink 112, to that CPE 104. The CPE 104 then uses these channel parameter measurements to determine the quality of its uplink. These channel parameter measurements can include a SNR and/or a BER measurement of the uplink 112(a)–(c). For example, base station 102 can determine the quality of uplink 112(c) based on a measurement by its RSQ module 208 (see FIG. 3). A single SNR measurement or a series of several SNR measurements taken during a frame 300 (see FIG. 2) or during multiple frames may be used to determine the uplink quality. The control module 212 can analyze multiple measurements to determine an uplink's quality.

Continuing to block 406, the base station 102 or CPE 104 compares the calculated uplink quality with a current PHY mode threshold. The current PHY mode threshold can include an upper threshold and a lower threshold at which the PHY mode is changed. For example, if CPE 104(a) is currently uplinking data to base station 102 using PHY mode B, the PHY mode will change when the uplink quality exceeds an upper threshold or goes below a lower threshold.

Next at decision block 408, the CPE determines whether the uplink quality has decreased and crossed a PHY mode lower threshold according to the comparison made in block 406. Continuing with the example above, if the PHY mode lower threshold associated with PHY mode B has not been crossed, flow proceeds to decision block 410 where the system determines whether the uplink quality has crossed an upper PHY mode threshold associated with PHY mode B. If the current modulation upper threshold has been exceeded, flow continues to block 412 where the PHY mode is changed to a less robust, denser modulation. For example, PHY mode C is selected for CPE 104(a). The base station 102 can send a request to the CPE 104 indicating a desired uplink PHY mode change. Alternatively, the base station 102 transmits an uplink map to all CPEs 104 in the downlink subframe 302 (see FIG. 2) indicating which CPEs have been allotted uplink PS's and the PS's associated PHY modes. The base station 102 indicates to an individual CPE 104 that the PHY mode has been changed by allotting uplink subframe 304 PSs to that CPE that use a less robust PHY mode. For example, if the uplink PHY mode for CPE 104(a) is to be changed from PHY mode B to PHY mode C, the base station 102 assigns uplink subframe PS's which are to be modulated using PHY mode C. This uplink assignment serves as an indicator to the CPE that its uplink PHY mode has been change. Flow continues to a block 413 where the system can reallocate the newly available bandwidth. For example, the newly available bandwidth can be allocated for new or existing hard bandwidth commitments, new connections, or connections that had been previously suspended. Flow then returns to block 402 as described above.

Returning to decision block 410, if the current PHY mode upper threshold has not been exceeded, flow continues to block 402 as described above.

Returning to decision block 408, if the PHY mode lower threshold has been crossed, flow proceeds to a decision block 414 where the system determines whether the connections, between the CPE and base station that have a hard bandwidth commitment, are using a less robust PHY mode than the planned PHY mode for the connections. If the connection(s) is using a less robust PHY mode than its planned PHY mode, the process proceeds to block 416 where a more robust PHY mode is selected for the connection(s). If the base station determines whether the uplink quality has crossed a threshold, the base station 102 can send a request to the CPE 104 indicating a desired uplink PHY mode change. Alternatively, the base station 102 can transmit an uplink map to all CPEs 104 in the downlink subframe 302 indicating which CPEs have been allotted uplink PS's along with the PS's associated PHY modes. This allows the base station 102 to indicate to an individual CPE 104 that the PHY mode has been changed by allotting uplink subframe 304 PSs to that CPE that uses a more robust PHY mode. For example, if the uplink PHY mode for CPE 104(a) is to be changed from PHY mode B to PHY mode A, the base station 102 assigns uplink subframe PS's which are to be modulated using PHY mode A. This uplink assignment serves as an indicator to CPE 104(a) that its uplink PHY mode has been change. Flow then continues to block 420 where a precedence module 210 (see FIG. 3) determines whether connections between the base station and the CPEs are to be suspended. Precedence will be explained with reference to FIG. 5. Flow then continues to block 402 as described above.

Returning to decision block 414, if the connection's current PHY mode is at least as robust as its planned PHY mode, the process continues to decision block 418 where the control module 212 can replace the lower threshold associated with the current PHY mode of the connection that has the hard bandwidth commitment with a second lower threshold. The process continues to block 402 as described above except that at block 406 the RSQ module 208 and the control module 212 use the second lower threshold to compare with the measured signal quality of the connection.

Returning to decision block 418, if the control module does not select the second lower threshold, the process moves to a block 420, as described above, where the precedence module 210 (see FIG. 3) determines whether connections between the base station and the CPEs are to be suspended. Precedence will be explained with reference to FIG. 5. Once precedence has been applied, the process returns to state 402 as described above.

Figure 5:
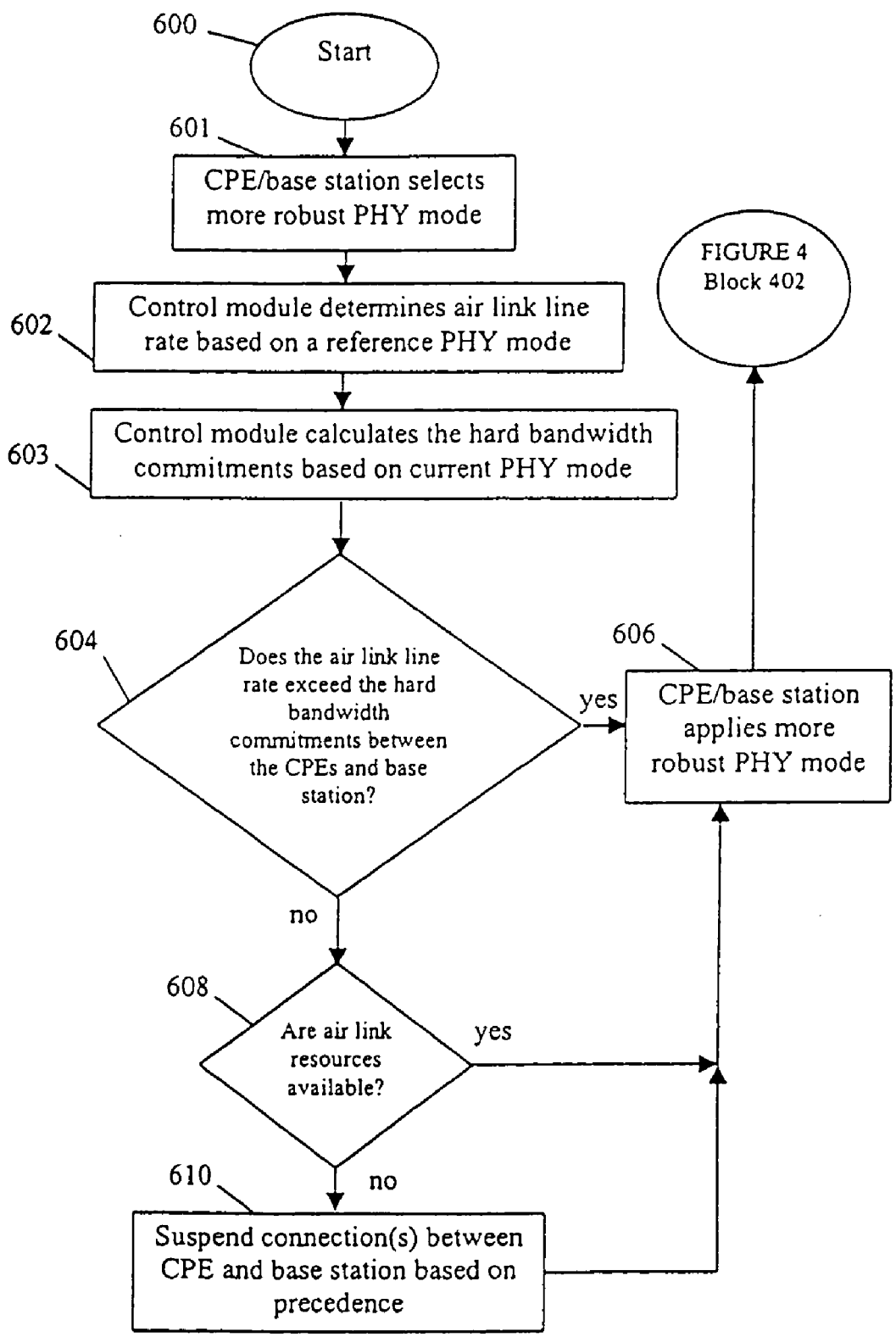
FIG. 5 is a flowchart illustrating the process of precedence being applied to existing connections between the CPE and the base station.

FIG. 5 is a flowchart illustrating the process of applying precedence to existing connections between the CPEs 104 and the base station that have hard bandwidth commitments. This process can be implemented by a modem 108 at a base station. Alternatively, this process is performed by a modem 108 at the CPE. Flow begins in start block 600. Flow moves to block 601 where a more robust PHY mode is selected for the existing connection. Flow proceeds to block 602 where the control module 212 determines an air link line rate based on a reference PHY mode. Flow moves to block 603 where the control module calculates the hard bandwidth commitments for the existing connections between the base station 102 and CPEs 104 based on the current PHY mode for each connection. Flow moves to a decision block 604 where the precedence module 210 determines whether the air link line rate determined at block 602 exceeds the hard bandwidth commitments between the CPEs and base station. If the air link line rate exceeds the hard bandwidth commitments, the process continues to a block 606 where the more robust PHY mode selected in block 601 is applied for the existing connection. Flow then returns to block 402 of FIG. 4 where the base station 102 receives the next uplink from a CPE 104.

Returning to decision block 604, if the air link line rate does not exceed the hard bandwidth commitments, flow proceeds to a decision block 608 where the precedence module 210 determines whether additional air link resources are available. These additional air link resources can include available bandwidth in the uplink subframe 302 and available bandwidth in the downlink subframe 304 (see FIG. 2). If additional air link resources are available, flow proceeds to block 606 where the more robust PHY mode is applied for the existing connection. Flow then returns to block 402 of FIG. 4 where the base station 102 receives the next uplink from a CPE 104.

Returning to decision block 608, if additional air link resources are not available, flow moves to a block 610 where the precedence module 210 suspends existing connections between the base station 102 and the CPEs 104. As described above, the precedence module 210 can, for example, suspend connections only between the base station and the affected CPE, randomly suspend connections between the base station and all of the CPEs in a sector 106, or suspend connections between the base station and all of the CPEs in the sector in a round-robin fashion. Further, the precedence module 210 can randomly suspend connections between the base station and the CPEs that have a lower precedence priority than other connections. Alternatively, the precedence module 210 can suspend the connections that have a lower precedence priority in a round-robin fashion. The process moves to block 606 as described above where the more robust PHY mode is applied for the existing connection. The process then returns to block 402 of FIG. 4 where the base station 102 receives the next uplink from a CPE 104.

Figure 6:
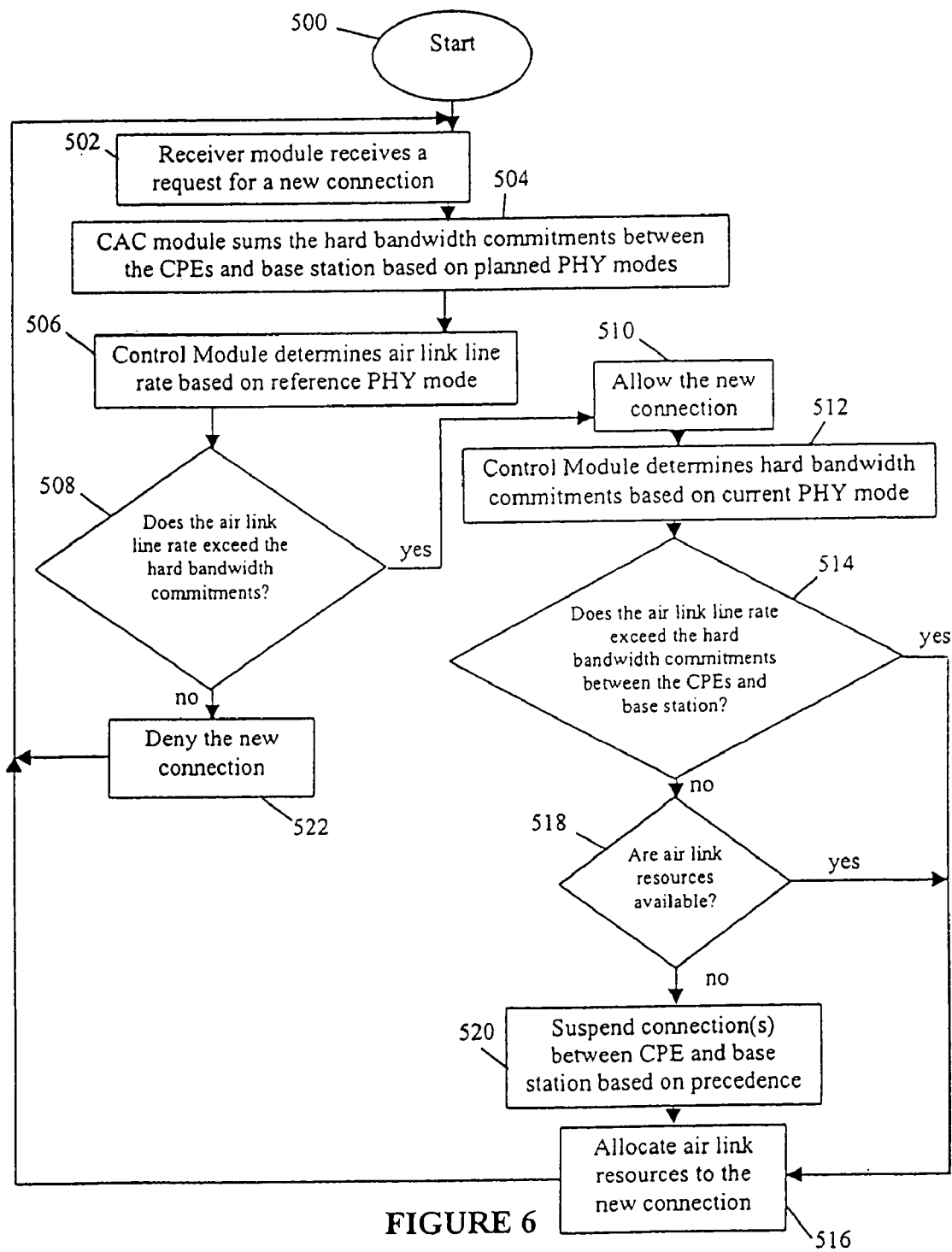
FIG. 6 is a flowchart illustrating the process of call admission control to a new connection between a CPE and the base station.

FIG. 6 is a flowchart illustrating the process of call admission control for a new connection between a CPE and the base station. This process can be implemented at a base station. Alternatively, this process is performed at the CPE. Flow begins in start block 500. Flow proceeds to block 502 where the base station receiver module receives a request for a new connection. The process continues to block 504 where the CAC module 206 sums the hard bandwidth commitments between the CPEs and base station based on the planned modulations of the CPEs. Next, at a block 506, the control module 212 determines an air link line rate for the existing connections between the base station and CPEs based on the reference PHY mode. Flow moves to a decision block 508 where the CAC module 206 determines whether the air link line rate determined at block 506 exceeds the hard bandwidth commitments determined at block 504. If the air link line rate exceeds the hard bandwidth commitments, the process continues to a block 510 where the CAC module 206 allows the new connection. However, air link resources are not initially allocated to the connection since the connection has been allowed based on the planned PHY modes of the CPEs and base station. The CPEs and base station could be operated at a more robust PHY mode than their planned PHY mode.

Flow proceeds to block 512 where the control module 212 determines the hard bandwidth commitments for the existing connections between the base station 102 and CPEs 104 based on the current PHY mode for each connection. Flow moves to a decision block 514 where the precedence module 210 determines whether the air link line rate determined at block 506 exceeds the hard bandwidth commitments between the CPEs and base station determined at block 512. If the air link line rate exceeds the hard bandwidth commitments, the process continues to a block 516 where the base station allocates air link resources to the new connection. Flow then returns to block 502 where the base station 102 receives a request for a new connection.

Returning to decision block 514, if the air link line rate does not exceed the hard bandwidth commitments, flow proceeds to a decision block 518 where the precedence module 210 determines whether additional air link resources are available. These additional air link resources can include available bandwidth in the uplink subframe 302 and available bandwidth in the downlink subframe 304 (see FIG. 2). If additional air link resources are available, flow proceeds to block 516 where the base station allocates air link resources to the new connection. Flow then returns to block 502 where the base station 102 receives a request for a new connection.

Returning to decision block 518, if additional air link resources are not available, flow moves to a block 520 where the precedence module 210 suspends existing connections between the base station 102 and the CPEs 104. As described above, the precedence module 210 can, for example, suspend connections only between the base station and the affected CPE, randomly suspend connections between the base station and all of the CPEs in a sector 106, or suspend connections between the base station and all of the CPEs in the sector in a round-robin fashion. Alternatively, the new connection is accepted into a suspended state since the precedence module 210 has already determined which of the other connections are to be suspended. Further, the precedence module 210 can randomly suspend connections between the base station and the CPEs that have a lower precedence priority than other connections. Alternatively, the precedence module 210 can suspend the connections that have a lower precedence priority in a round-robin fashion. The process moves to block 516 where the base station allocates air link resources to the new connection. Flow then returns to block 502 where the base station 102 awaits a request for a new connection.

Returning to decision block 508, if the air link line rate does not exceed the hard bandwidth commitments, flow proceeds to a block 522 where the CAC module 206 denies the new connection. The process then returns to block 502 to await the next request for a new connection.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the embodiments should not be taken to imply that the terminology is being re-defined herein to be restricted to including any specific characteristics of the features or aspects of the embodiment with which that terminology is associated. The scope of the embodiments should therefore be construed in accordance with the appended claims and any equivalents thereof.

What is claimed is:

1. A method for controlling connections between a base station and a plurality of customer premise equipment (CPEs) in a wireless communication system, wherein the base station and the CPEs each are configured to adaptively adjust a modulation scheme for an uplink which includes one or more connections, wherein a planned modulation scheme selected for the uplink and wherein a current modulation scheme corresponds to the modulation technique used by a first CPE to transmit data, the method comprising:
   receiving an uplink that is modulated by the first CPE using a current modulation scheme;
   determining a quality for a channel parameter for the uplink;
   comparing the quality with a current modulation scheme lower threshold;
   comparing the quality with a current modulation scheme upper threshold;
   if either the current modulation scheme upper or lower threshold has been crossed, determining a normalized hard bandwidth commitments for the uplink based on a second current modulation scheme to be used by the first CPE;
   if an air link line rate exceeds the normalized hard bandwidth commitments between the CPEs and the base station, applying the second current modulation scheme to the first CPE uplink, else suspending a connection between one of the plurality of CPEs and the base station.

2. The method of claim 1, wherein suspending the connection includes:
   assigning a precedence level to each connection between the base station and the plurality of CPEs, wherein the precedence level is utilized to select the suspended connection between the base station and one of the plurality of CPEs.

3. The method of claim 1, wherein the suspended connection between the base station and one of the plurality of CPEs is a new connection.

4. The method of claim 1, wherein the suspended connection is using a more robust modulation scheme than a planned modulation scheme.

5. The method of claim 1, wherein the suspended connection is randomly selected from connections between the plurality of CPEs and the base station.

6. The method of claim 5, wherein the base station and the plurality of CPEs, are all located in a sector.

7. The method of claim 6, wherein the suspended connection is selected in a round-robin fashion from connections between the plurality of CPEs and the base station.

8. The method of claim 1, further comprising:
   assigning a precedence priority value to each connection; and
   suspending the connection based on the assigned precedence priority value.

9. The method of claim 8, wherein suspending the connection is performed in a round-robin fashion.

10. The method of claim 8, wherein suspending the connection is performed in a random fashion.

11. The method of claim 1, wherein the normalized hard bandwidth commitments include constant bit rate (CBR) connections.

12. The method of claim 1, wherein the normalized hard bandwidth commitments include a minimum cell rate (MCR) portion of a guaranteed frame rate (GFR) connection.

13. The method of claim 1, wherein the normalized hard bandwidth commitments include some function of sustainable cell rate (SCR) for variable bit rate (VBR) and variable bit rate real-time (VBR-rt) connections.

14. The method of claim 1, wherein the normalized hard bandwidth commitments include measured bandwidth requirements for connections.

15. The method of claim 1, further comprising:
    selecting a less robust modulation scheme for at least one connection between the plurality of CPEs and the base station as a new current modulation scheme;
    determining a second normalized hard bandwidth commitments between the base station and the plurarity of CPEs based on the new current modulation scheme;
    if the air link line rate exceeds the second normalized hard bandwidth commitments, unsuspending the suspended connection between the base station and the one of the plurality of CPEs that had its connection suspended.

16. A method for controlling connections between a base station and a plurality of customer premise equipment (CPEs) in a wireless communication system, wherein the base station and the plurality of CPEs each are configured to adaptively adjust channel characteristics for a downlink which includes one or more connections, wherein a planned modulation scheme is selected for the downlink and wherein a current modulation scheme corresponds to the modulation technique used by the base station to transmit data to a first CPE, the method comprising:
    receiving a downlink that is modulated by a base station using a current modulation scheme;
    determining a quality for a channel parameter for the downlink;
    comparing the quality with a current modulation scheme lower threshold;
    comparing the quality with a current modulation scheme upper threshold;
    if either the current modulation scheme upper or lower threshold has been crossed, determining a normalized hard bandwidth commitments for the downlink based on a second current modulation scheme to be used by the base station to transmit;
    if an air link line rate exceeds the normalized hard bandwidth commitments between the plurality of CPEs and the base station, applying the second current modulation scheme to the downlink to the first CPE, else suspending a connection between one of the plurality of CPEs and the base station.

17. The method of claim 16, wherein suspending the connection includes:
    assigning a precedence level to each connection between the base station and the plurality of CPEs, wherein the precedence level is utilized to select the suspended connection between the base station and the plurality of CPEs.

18. The method of claim 16, wherein the suspended connection between the base station and one of the plurality of CPEs is a new connection.

19. The method of claim 16, wherein the suspended connection is using a more robust modulation scheme than a planned modulation scheme.

20. The method of claim 16, wherein the suspended connection is randomly selected from connections between the plurality of CPEs and the base station.

21. The method of claim 20, wherein the base station and the plurality of CPEs, are all located in a sector.

22. The method of claim 21, wherein the suspended connection is selected in a round-robin fashion from connections between the plurality of CPEs and the base station.

23. The method of claim 16, further comprising:
    assigning a precedence priority value to each connection; and
    suspending the connection based on the assigned precedence priority value.

24. The method of claim 23, wherein suspending the connection is performed in a round-robin fashion.

25. The method of claim 23, wherein suspending the connection is performed in a random fashion.

26. The method of claim 16, wherein the normalized hard bandwidth commitments include constant bit rate (CBR) connections.

27. The method of claim 16, wherein the normalized hard bandwidth commitments include a minimum cell rate (MCR) portion of a guaranteed frame rate (GFR) connection.

28. The method of claim 16, wherein the normalized hard bandwidth commitments include some function of sustainable cell rate (SCR) for variable bit rate (VBR) and variable bit rate real-time (VBR-rt) connections.

29. The method of claim 16, wherein the normalized hard bandwidth commitments include measured bandwidth requirements for connections to provide a quality of service.

30. The method of claim 16, further comprising:
    selecting a less robust modulation scheme for at least one connection between the plurality of CPEs and the base station as a new current modulation scheme;
    determining a second normalized hard bandwidth commitments between the base station and the plurality of CPEs based on the new current modulation scheme;
    if the air link line rate exceeds the second normalized hard bandwidth commitments, unsuspending the suspended connection between the base station and the one of the plurality of CPEs that had its connection suspended.

31. A method for controlling bandwidth in a communication system that is configured for adaptive modulation where new and existing connections between customer premises equipments (CPEs) and a base station can be suspended and unsuspended depending on planned and current bandwidth utilization for the communication system, the method comprising:
    determining a first planned modulation scheme for a first connection between a base station and a first CPE;
    receiving data which is modulated using a first current modulation scheme via the first connection;
    determining a signal quality for the received data;
    comparing the signal quality with either an upper threshold value or a lower threshold value;
    if the signal quality has increased across the upper threshold value, selecting a less robust modulation scheme to replace the first current modulation scheme for the first connection;
    if the signal quality has decreased across the lower threshold value, selecting a more robust modulation scheme to replace the first current modulation scheme for the first connection;
    if the more robust modulation scheme is selected, comparing an air link line rate which is based on a reference modulation scheme with a hard bandwidth commitment value for connections between the CPEs and base station which is based on a current modulation scheme for each CPE's connections; and if the air link line rate does not exceed the hard bandwidth commitment value, suspending a second connection.

32. The method of claim 31, wherein the CPEs and the base station are located in a sector.

33. The method of claim 31, wherein the hard bandwidth commitment value includes constant bit rate (CBR) connections.

34. The method of claim 31, wherein the hard bandwidth commitment value includes a minimum cell rate (MCR) portion of a guaranteed frame rate (GFR) connection.

35. The method of claim 31, wherein the hard bandwidth commitment value includes some function of sustainable cell rate (SCR) for variable bit rate (VBR) and variable bit rate real-time (VBR-rt) connections.

36. The method of claim 31, wherein the hard bandwidth commitment value includes measured bandwidth requirements for connections to provide a quality of service.

37. The method of claim 31, wherein the suspended second connection is selected randomly from all connections between the base station and the CPEs.

38. The method of claim 31, wherein the suspended second connection is selected in a round robin fashion from all connections between the base station and the CPEs.

39. The method of claim 31, further comprising:
assigning a first precedence level to the first connection;
assigning a second precedence level that has a lower priority than the first precedence level to the second connection, suspending the second connection because the second precedence level has a lower priority than the first precedence level.

40. The method of claim 31, wherein radio frequency planning determines the first planned modulation scheme.

41. The method of claim 31, wherein the signal quality is determined by measuring a bit error rate (BER).

42. The method of claim 31, wherein the signal quality is determined by measuring a signal to noise ratio (SNR).

43. The method of claim 39, wherein the suspended second connection is selected randomly from between the first and second connections, wherein the first and second connections have the same precedence level.

44. The method of claim 39, wherein the suspended connection is selected in a round-robin fashion from between the first and second connections, wherein the first and second connections have the same precedence level.

45. The method of claim 31, wherein the first planned modulation scheme comprises a modulation technique coupled wit forward error correction (FEC).

46. The method of claim 31, wherein the first current modulation scheme comprises a modulation technique coupled with forward error correction (FEC).

47. A method for selecting connections to suspend between a base station and associated terminals in a wireless communication system, wherein the base station and the associated terminals each are configured to adaptively adjust channel characteristics for each of their connections, wherein a current modulation scheme corresponds to the modulation technique used by the terminals and base station to transmit data, the method comprising:
changing a current modulation scheme for a selected connection between a base station and associated terminals;
summing the hard bandwidth commitments between the base station and the associated terminals based on the current modulation scheme for each connection;
determining an air link line rate for all connections between the base station and the associated terminals based on a reference modulation scheme;

if the air link line rate exceeds the hard bandwidth commitments, allocating air link resources to the selected connection, else suspending at least one of the connections between the base station and the associated terminals.

48. The method of claim 47, wherein the hard bandwidth commitments are a total of all requested bandwidth between the associated terminals and the base station assuming each connection is modulated using its current modulation scheme.

49. The system of claim 48, wherein the total of all requested bandwidth includes normalizing each connection's bandwidth using each connection's current modulation scheme.

50. The method of claim 47, wherein the base station and the associated terminals are located in a sector.

51. The method of claim 47, wherein suspending the at least one of the connections includes suspending connections between the base station and the associated terminals in a round-robin fashion.

52. The method of claim 47, wherein suspending the at least one of the connections includes randomly suspending connections between the base station and the associated terminals.

53. The method of claim 47, further comprising:
assigning a precedence priority value to each of the connections; and
suspending the at least one of the connections based on the assigned precedence priority value.

54. The method of claim 53, wherein suspending the at least one of the existing connections is performed in a round-robin fashion.

55. The method of claim 53, wherein suspending the at least one of the existing connections is performed in a random fashion.

56. The method of claim 1, wherein the current modulation scheme comprises different types of modulation.

57. The method of claim 56, wherein the different types of modulation comprise quadrature amplitude modulation.

58. The method of claim 1, wherein the second current modulation scheme comprises different types of modulation.

59. The method of claim 58, wherein the different types of modulation comprise quadrature amplitude modulation.

60. The method of claim 1, wherein the current modulation scheme comprises forward error correction.

61. The method of claim 1, wherein the second current modulation scheme comprises forward error correction.

62. The method of claim 16, wherein the current modulation scheme comprises different types of modulation.

63. The method of claim 62, wherein the different types of modulation comprise quadrature amplitude modulation.

64. The method of claim 16, wherein the second current modulation scheme comprises different types of modulation.

65. The method of claim 64, wherein the different types of modulation comprise quadrature amplitude modulation.

66. The method of claim 16, wherein the current modulation scheme comprises forward error correction.

67. The method of claim 16, wherein the second current modulation scheme comprises forward error correction.

68. The method of claim 31, wherein the first planned modulation scheme comprises different types of modulation.

69. The method of claim 68, wherein the different types of modulation comprise quadrature amplitude modulation.

70. The method of claim 31, wherein the first current modulation scheme comprises different types of modulation.

71. The method of claim 70, wherein the different types of modulation comprise quadrature amplitude modulation.

72. The method of claim 31, wherein the first planned modulation scheme comprises forward error correction.

73. The method of claim 31, wherein the first current modulation scheme comprises forward error correction.

74. The method of claim 47, wherein the current modulation scheme comprises different types of modulation.

75. The method of claim 74, wherein the different types of modulation comprise quadrature amplitude modulation.

76. The method of claim 47, wherein the reference modulation scheme comprises different types of modulation.

77. The method of claim 76, wherein the different types of modulation comprise quadrature amplitude modulation.

78. The method of claim 47, wherein the current modulation scheme comprises forward error correction.

79. The method of claim 47, wherein the reference modulation scheme comprises forward error correction.

* * * * *